(12) United States Patent
Hernandez et al.

(10) Patent No.: US 9,440,167 B2
(45) Date of Patent: Sep. 13, 2016

(54) SYSTEMS AND METHODS FOR SUB-SEA SEPARATION

(71) Applicant: KELLOGG BROWN & ROOT LLC, Houston, TX (US)

(72) Inventors: Robert Hernandez, Stafford, TX (US); Michael A. G. Hardy, Houston, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 316 days.

(21) Appl. No.: 14/210,092

(22) Filed: Mar. 13, 2014

(65) Prior Publication Data

US 2014/0275690 A1 Sep. 18, 2014

Related U.S. Application Data

(60) Provisional application No. 61/783,661, filed on Mar. 14, 2013.

(51) Int. Cl.
*B01D 17/02* (2006.01)

(52) U.S. Cl.
CPC .................. *B01D 17/0217* (2013.01)

(58) Field of Classification Search
None
See application file for complete search history.

(56) References Cited

U.S. PATENT DOCUMENTS

| 3,013,866 | A | * | 12/1961 | Samaniego | ........ B01D 11/0434 366/307 |
| 4,218,575 | A | * | 8/1980 | Webb, Jr. | .................. C07C 2/62 585/715 |
| 4,221,658 | A | * | 9/1980 | Hardwick | .......... B01D 11/0449 210/511 |
| 4,449,828 | A | * | 5/1984 | Mansour | .................. B01F 5/10 366/147 |
| 6,362,367 | B2 | * | 3/2002 | Braithwaite | .................. 261/128 |
| 2011/0110831 | A1 | * | 5/2011 | Wyczalkowski | ...... B01D 9/005 423/158 |
| 2011/0186513 | A1 | * | 8/2011 | Vuong | .................. B01D 61/04 210/636 |
| 2012/0000851 | A1 | * | 1/2012 | Vuong | .................. B01D 61/04 210/636 |

* cited by examiner

*Primary Examiner* — Tam M Nguyen
(74) *Attorney, Agent, or Firm* — Gary Machetta (57) ABSTRACT

Systems and methods for two-phase separation are provided. The system can include a vessel having a first end, a second end, an internal volume, an inlet, a first outlet, and a second outlet. At least one separation tray can be disposed within the internal volume. The inlet can be disposed between the separation tray and the second end. At least one impeller can be connected to a shaft and disposed within the internal volume. The shaft can be mechanically linked to a motor. The at least one impeller can be disposed between the at least one separation tray and the first end.

15 Claims, 6 Drawing Sheets

SYSTEMS AND METHODS FOR SUB-SEA SEPARATION

CROSS-REFERENCE TO RELATED APPLICATION

This application claims priority to U.S. Provisional Patent Application having Ser. No. 61/783,661, filed Mar. 14, 2013, which is incorporated by reference herein.

BACKGROUND

1. Field

Embodiments described generally relate to the production and processing of hydrocarbons. More particularly, such embodiments relate to subsea hydrocarbon production and processing.

2. Description of the Related Art

Subsea production systems are widely used in producing oil and/or gas containing fluids, e.g., hydrocarbon production fluids, from deepwater fields. Subsea transport lines are used to transport the production fluid from the wellhead to a receiving platform. Unstable flow conditions can occur in subsea hydrocarbon production requiring artificial lift techniques to bring the hydrocarbons to the surface in new production, referred to as "green fields," and/or during reservoir maintenance, referred to as "brown fields." The hydrocarbon production fluids typically contain varying amounts of oil, gas, sediment, and water, resulting in variations of the multi-phase mixtures. These multi-phase mixtures can result in slug flow and other unstable flow conditions that can disrupt the transportation of the hydrocarbon production fluids to the surface. Slug flow commonly refers to a flowing production fluid in which large pockets of a gas are contained within a liquid.

Subsea separation units have been used to remove water and/or sediment from the production fluids to minimize slug flow. Gravity separators are used to combat slug flow in production fluids caused by water/oil mixtures by allowing the water in the production fluid to settle at the bottom of a vessel for separation thereof. Gravity separators, however, usually require a large vessel, which in a subsea environment can require excessive wall thicknesses resulting in a large, heavy vessel that can be difficult to position in subsea locations. Cyclone separators have been used to combat some of the size and weight limitations associated with gravity separators. Cyclone separators, however, typically require specific pressure differentials to achieve a desired degree of separation and such pressure differentials can be difficult to control in a subsea environment. Additionally, the use of gravity and cyclone separators are encumbered with additional costs due to the necessity of topside equipment.

There is a need, therefore, for new apparatus and methods for reducing slug flow from a multi-phase production fluid and/or separating hydrocarbons from the multi-phase production fluid.

DETAILED DESCRIPTION

Systems and methods for two-phase separation are provided. The system can include a vessel having a first end, a second end, an internal volume, an inlet, a first outlet, and a second outlet. At least one separation tray can be disposed within the internal volume. The inlet can be disposed between the separation tray and the second end. At least one impeller can be connected to a shaft and disposed within the internal volume. The shaft can be mechanically linked to a motor. The at least one impeller can be disposed between the at least one separation tray and the first end.

Figure 1:
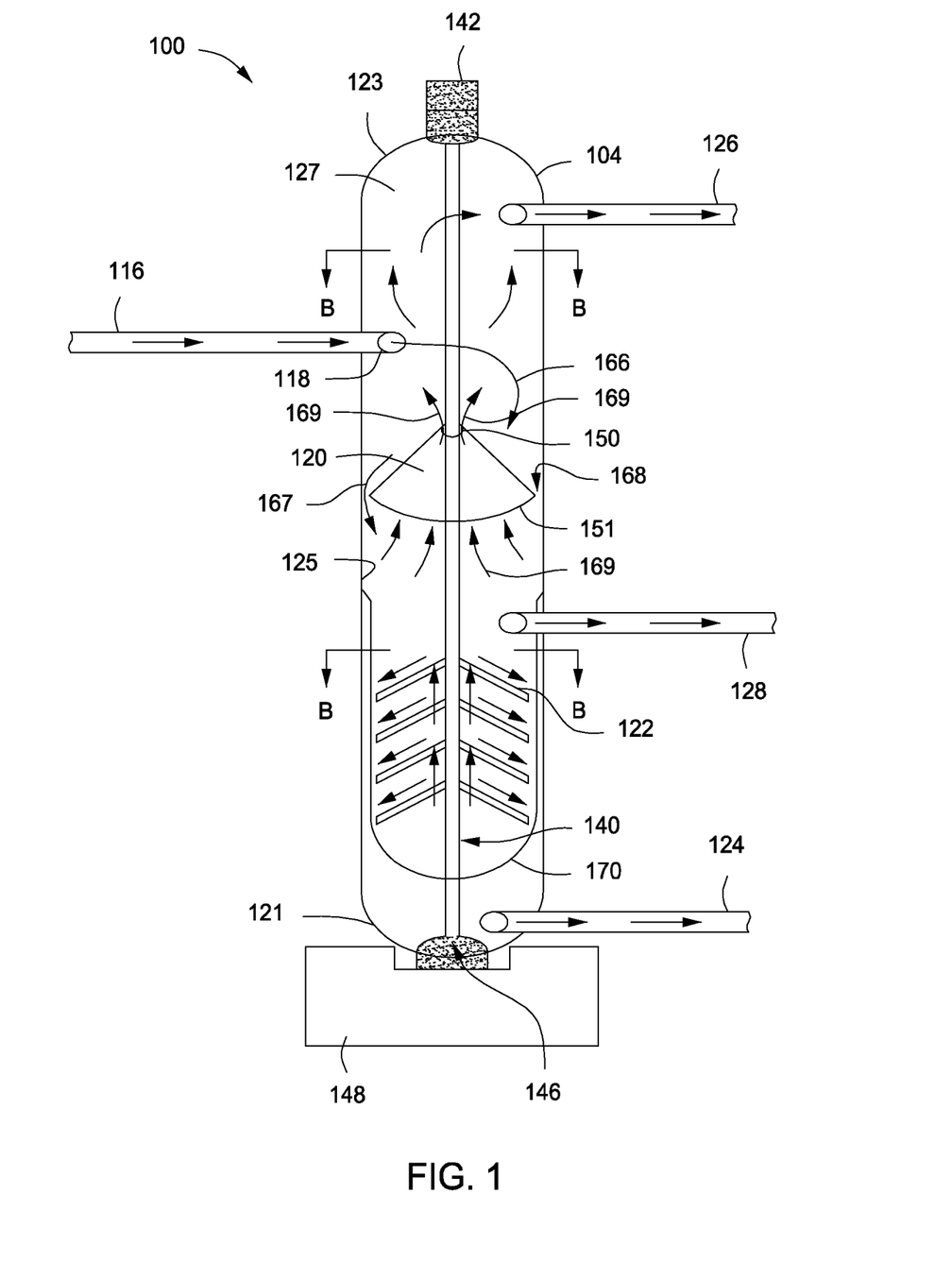
FIG. 1 depicts an illustrative separation system for separating one or more multi-phase mixtures, according to one or more embodiments described.

FIG. 1 depicts an illustrative separation system 100 for separating one or more materials having a first phase or a first state of matter from a multi-phase mixture containing the same materials and/or different materials having a second phase or a second state matter different than the first phase or the first state of matter, according to one or more embodiments. The separation system 100 can include one or more vessels or "separation vessels" or "separators" 104. The separator 104 can include one or more separator inlets 118, one or more separation trays 120, one or more impellers 122, one or more first or "bottom" outlets 124, and one or more second or "top" outlets 126. The separator 104 can also include one or more intermediate outlets 128. The separator 104 can also have an inner wall or surface 125, an enclosed first or "bottom" end 121, and an open (not shown) or enclosed second or "top" end 123. The separator 104 can have an inner cross-sectional shape that can be rectangular, elliptical, circular, oval, polygonal, non-polygonal, or any combination thereof. Depending, at least in part, on the configuration of the inner wall 125, the inner wall 125 can form, at least in part, an internal volume 127. For example, the inner wall 125 can form or define the internal volume 127 having a cylindrical, spherical, ellipsoidal, spheroidal (e.g., prolate or oblate), and/or frustoconical configuration or shape. The separator inlet 118 can be positioned intermediate the first end 121 and the second end 123 and in fluid communication with the internal volume 127. The bottom outlet 124 can be positioned on or about the first end 121 and in fluid communication with the internal volume 127. In another example, the bottom outlet 124 can be positioned intermediate the first end 121 and the separator inlet 118 and in fluid communication with the internal volume 127. The top outlet 126 can be positioned on the second end 123 and in fluid communication with the internal volume 127. In another example, the top outlet 126 can be positioned intermediate the second end 123 and the separator inlet 118 and in fluid communication with the internal volume 127. The intermediate outlet 128 can be positioned on the separator 104 intermediate the bottom outlet 124 and the top outlet 126. In some examples, the intermediate outlet 128 can be positioned intermediate the one or more separation trays 120 and the bottom outlet 124.

The separation system 100 can be used to separate a wide variety of the multi-phase mixtures in a line 116 that can be introduced through the separator inlet 118 to the internal volume 127. The multi-phase mixture can be or include one or more liquid/gas mixtures, liquid/solid mixtures, gas/solid mixtures, or gas/liquid/solid mixtures. The multi-phase mixture can include any homogeneous composition or heterogeneous composition. In some examples, the multi-phase mixture can include two or more compositions of the same state of matter (e.g., gas, liquid, or solid), but have different densities and therefore different phases. In one example, the separation system 100 can be used to separate any multi-phase mixture, such as a multi-phase mixture obtained, collected, recovered, produced, or otherwise acquired from a subsea hydrocarbon production well. For example, the separation system 100 can be used to separate a multi-phase hydrocarbon production fluid exiting subsea production equipment. The multi-phase hydrocarbon production fluid or mixture can be or include one or more liquid/gas hydrocarbon mixtures, liquid/solid hydrocarbon mixtures, gas/solid hydrocarbon mixtures, or gas/liquid/solid hydrocarbon mixtures. Subsea production equipment or subsea units can include christmas trees, risers, umbilicals, or any combination thereof.

The separation system 100 can be located, but not limited to, subsea, on a surface platform, on land, or other locations. For example, the separation system 100 can be disposed subsea on a seabed or seafloor. In another example, the separation system 100 can be disposed subsea, for example, on a support platform or other foundation. As used herein, the terms "subsea" and "sub-sea" are used interchangeably and refer to a location below a surface of any body of water. Illustrative bodies of water can include, but are not limited to, rivers, ponds, lakes, bays, seas, oceans, and the like.

The separator 104 can have a pressure differential between the pressure inside the separator 104, e.g., the pressure within the internal volume 127, and the pressure outside the separator 104, e.g., the pressure external the separator 104. The pressure differential between the inside of the separator 104 and outside the separator 104 can be about 100,000 kPa or less, about 70,000 kPa or less, about 35,000 kPa or less, or about 20,000 kPa or less. For example, the pressure differential between the inside of the separator 104 and outside the separator 104 can range from a low of about 1 kPa, about 500 kPa, about 1,000 kPa, about 1,750 kPa, about 2,500 kPa, or about 3,500 kPa to a high of about 17,000 kPa, about 25,000 kPa, about 30,000 kPa, about 40,000 kPa, or about 45,000 kPa. In another example, the pressure differential between the inside of the separator 104 and outside the separator 104 can be about 1 kPa to about 70,000 kPa, about 700 kPa to about 35,000 kPa, about 3,500 kPa to about 20,000 kPa, about 7,000 kPa to about 40,000 kPa, or about 14,000 kPa to about 50,000 kPa. As the pressure differential between the inside of the separator 104 and outside the separator 104 reduces the wall thickness of the separator 104 can be reduced. The separator 104 can have a wall thickness of about 25 cm or less, about 20 cm or less, about 15 cm or less, about 10 cm or less, about 7 cm or less, about 5 cm or less, about 4 cm or less, about 3 cm or less, about 2 cm or less, or about 1 cm or less. For example, the separator 104 can have a wall thickness of about 1 cm to about 20 cm, about 0.2 cm to about 10 cm, about 0.5 cm to about 5 cm, or about 0.8 cm to about 2 cm.

As used herein, the terms "up" and "down;" "upward" and "downward;" "upper" and "lower;" "upwardly" and "downwardly;" "above" and "below;" "top" and "bottom," and other like terms refer to relative positions to one another and are not intended to denote a particular spatial orientation since the system and methods of using the same can be equally effective at various angles or orientations.

A longitudinal axis of the separator 104 can be vertically oriented or oriented at an angle with respect to vertical of about 1°, about 5°, about 10°, about 20°, or about 30° and about 60°, about 70°, or about 80°. In one or more embodiments, the separator 104 or the longitudinal axis of the separator 104 can be substantially vertically oriented. For example, a substantially vertical separator 104 or the longitudinal axis thereof can be at angle of about −20° to about 20°, about −15° to about 15°, about −10° to about 10°, about −5° to about 5°, about −3° to about 3°, about −2° to about 2°, about −1° to about 1°, about −0.1° to about 0.1°, about −0.01° to about 0.01°, about −0.001° to about 0.001°, or about −0.0001° to about 0.0001° with respect to vertical.

The one or more separator inlets 118 can be tangentially disposed with respect to the inner surface 125 of the separator vessel 104. The separator inlet 118 can be tangentially disposed in the separator vessel 104 in order to facilitate, improve, sustain, or otherwise contribute to the formation of a vortex or other rotational flow pattern around or about the internal surface 125 of the separator vessel 104. For example, a multi-phase mixture traveling through line 116 can enter the separator 104 in a tangential direction with respect to the inner surface 125 via the tangentially arranged separator inlet 118 such that at least a portion of the multi-phase mixture travels around the inner surface 125 of the separator 104. The multi-phase mixture traveling around the inner surface 125 of the separator vessel 104 can result in a first rotating vortex 166 (see arrow) of the multi-phase mixture within the internal volume 127 of the separator 104. The separator inlet 118 can be disposed at an angle relative to a horizontal plane intersecting the separator inlet 118. For example, the separator inlet 118 can be disposed at a decline with respect to horizontal thereby allowing or urging the multi-phase mixture to flow in a direction toward the bottom end 121.

The separator inlet 118 can be disposed intermediate or between the top end 123 and the separation tray 120, e.g., a gas-liquid separation tray. For example, the separator inlet 118 can be disposed intermediate the top outlet 126 and the separation tray 120. In another example (not shown), the separator inlet 118 can be disposed intermediate the top end 123 and the top outlet 126. As used herein, the term "separation tray" can include, but is not limited to, one or more surface(s) that can influence the direction of liquid in the separator 104 toward the inner wall 125 of the separator 104, such as a baffle, a distillation tray, or any other surface. The separation tray 120 can include one or more tray(s) and/or other structure having one or more surfaces. In one example, each tray of the separation tray 120 can have a flat surface area. In another example, each tray of the separation tray 120 can have a frustoconical surface. In another example, if the separation tray 120 includes two or more trays each tray can have the same type of surface of different types of surfaces with respect to one another.

The separation tray 120 can include a substantially flat surface that can be concentrically positioned within the separator 104. For example the separation tray 120 having a substantially flat surface can be disposed substantially perpendicular to the inner wall 125 of the separator 104. In another example, the separation tray 120 can have a conical shape or a frustoconical shape. The separation tray 120 can include an outer perimeter 151 and an inner perimeter 150. For example, the separation tray 120 having a frustoconical shape can be disposed within the separator 104 such that the inner perimeter 150 is at a height within the internal volume 127 higher than that of the outer perimeter 151. In another example, the separation tray 120 can be flat relative to horizontal. The inner perimeter 150 can form or define an aperture or hole through the upper portion of the separation tray 120.

The separation tray 120 can be concentrically disposed within the separator 104 such that an annulus or annular space 168 can be present between the inner wall 125 of the separator vessel 104 and the outer perimeter 151 of the separation tray 120. The inner perimeter 150 can form a center space that can be formed at the centerline of the separator vessel 104. The multi-phase mixture flowing through the transport line 116 can enter the separator 104 via the separator inlet 118 (e.g., the first vortex 166). In some examples, the multi-phase mixture flowing through the transport line 116 can come from a slug catcher (not shown) before flowing into the transport line 116. As the multi-phase mixture leaves the separator inlet 118, the mixture can flow at least partially around the inner wall 125 of the separator 104 in a rotational manner thus creating the first vortex. The first vortex 166 of the multi-phase mixture can flow over the separation tray 120 and through the annular space 168 between the outer perimeter 151 of the separation tray 120 and the inner wall 125 of the separator 104 (see arrows 167). The multi-phase mixture flowing through the annular space 168 can form at least a portion of a phase interface or separation loading area 170 disposed on the inner wall 125. A separated lighter gaseous phase can flow up the internal volume 127 of the separator 104 through the inner circle as shown (see arrows 169).

At least one impeller 122 can be disposed within the internal volume 127 of the separator 104. For example, one or more sets of impellers 122 can be disposed within the internal volume 127 of the separator 104. A set of impellers 122 can include a plurality of impeller paddles or blades disposed within the internal volume 127 of the separator 104. Each impeller paddle or blade can be connected to a rotating shaft 140.

In one or more embodiments, the impellers 122 can be disposed within the internal volume 127 of the separator 104 at any location between the separation tray 120 and the first end 121. For example, the impellers 122 can be disposed within the internal volume 127 intermediate the separation tray 120 and the bottom end 121 of the separator 104. In another example, the impellers 122 can be disposed at least about 0.1 meters (m) below the separation tray 120. In yet another example, the impellers 122 can be disposed from a low of about 0.3 m, about 0.5 m, about 1 m, or about 1.5 m to a high of about 2 m, about 3 m, about 4 m, about 5 m below the separation tray 120. The impellers 122 can include at least 2, at least 3, at least 4, at least 5, at least 6, at least 8, at least 10 sets of impellers, or more. For example, the impellers 122 can include 2, 3, or 4 to about 5, 6, or 7 sets of impellers. Each set of impellers 122 can be vertically stacked, one on top of another. In one or more embodiments, each set of impellers 122 can be separated from one another by a vertical height of at least about 1 cm, at least about 3 cm, at least about 5 cm, at least about 7 cm, or at least about 10 cm. For example, each set of impellers 122 can be separated from one another by a vertical height of about 10 cm, about 20 cm, or about 40 cm to about 50 cm, about 60 cm, about 100 cm, or about 1 m.

The rotating shaft 140 can be disposed at any location within the internal volume 127 of the separator 104. As depicted in FIG. 1, the rotating shaft 140 can be disposed along the centerline of the internal volume 127 of the separator 104. The rotating shaft 140 can be adapted to connect to or otherwise mechanically link with a motor 142. As shown, the motor 142 can be disposed on the second end 123 of the separator 104 and can be mechanically linked to the rotating shaft 140 via a mechanical linkage or other device (not shown). The mechanical linkage can include any joint or other connection that can mechanically link the motor 142 with the rotating shaft 140. The rotating shaft 140 can be held in position within the internal volume 127 of the separator 104 via rotating anchor 146 disposed on the first end 121 of the separator 104. In one or more embodiments (not shown), the motor 142 can be disposed at any location on or about the separator 104. In an example (not shown), the motor 142 can be disposed on an outer wall of the separator 104. In another example (not shown), the motor 142 can be disposed on the bottom of the separator 104. In such an example, the motor 142 and optionally the separator 104 can be at least partially supported by a foundation 148. When the motor 142 is disposed on the outer wall of the separator 104 at, toward, or about the second end 123 thereof the motor 142 can easily be replaced should replacement be required without having to raise the separator 104 to the surface.

Figure 2:
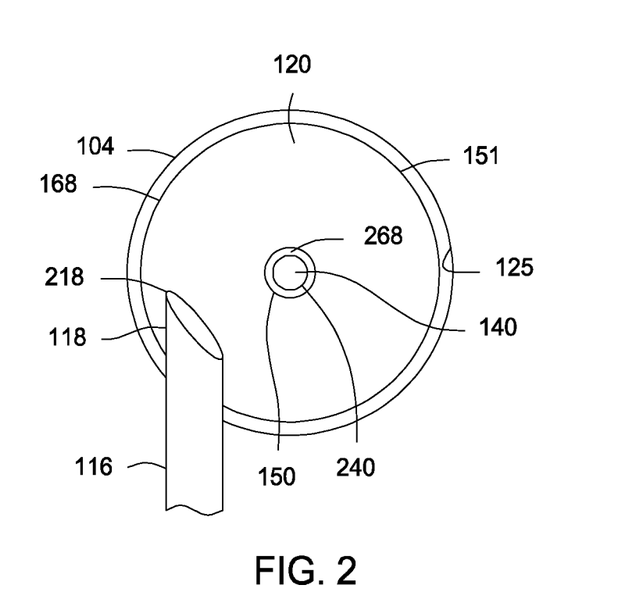
FIG. 2 depicts a cross-sectional view of a separator vessel depicted in FIG. 1 along line 2-2.
Figure 3:
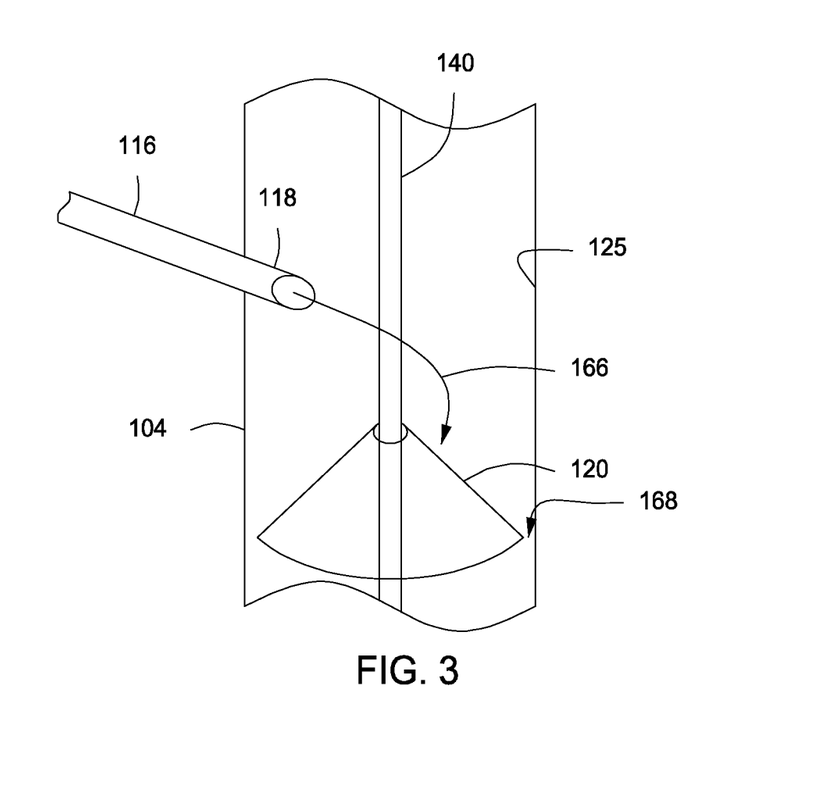
FIG. 3 depicts a partial cross-sectional side view of a separator inlet disposed over a separation tray within the separator vessel depicted in FIG. 1, according to one or more embodiments described.

The separation tray 120 can be adapted to allow the rotating shaft 140 to pass therethrough, as depicted in FIGS. 1-3. For example, the rotating shaft 140 can pass through the aperture or hole formed by the inner perimeter 150. The rotating shaft 140 can be concentrically positioned through the hole formed by the inner perimeter 150 to create an annulus or annular space 268. The annular space 268 can be present between an outer surface 240 of the rotating shaft 140 and the inner perimeter 150 of the separation tray 120 as depicted in FIG. 2. The annular space 268 can be referred to as an inner annular space and the annular space 168 can be referred to as an outer annular space.

As shown in FIG. 1, a heavier phase, e.g., liquid, of the multi-phase mixture can fall through the outer annular space formed between the separation tray 120 and the inner wall 125 to the bottom end 121 of the separator 104 while a lighter phase, e.g., gas, of the multi-phase mixture can rise through the inner annular space to the top end 123 of the separator 104 (see arrows 169). As shown in FIG. 1, the lighter gaseous phase of the multi-phase mixture can contact the underside of the separation tray 120 (see arrows 169). Heavier components, such as water, present in the lighter gaseous phase shown by arrows 169 can condense on the bottom surface of the separation tray and fall back toward the first end 121 of the separator 104. Thus, for example, the separation tray 120 can reduce or eliminate the presence of water in the gaseous phase exiting the separator via the top outlet 126.

The motor 142 can rotate the rotating shaft 140, and thus the one or more sets of impellers 122, at any desired rate. For example, the motor 142 can rotate the rotating shaft 140 at a rate from a low of about 10 revolutions per minute (rpm), about 30 rpm, about 50 rpm, or about 100 rpm to a high of about 200 rpm, about 500 rpm, about 1,000 rpm, about 2,000 rpm, about 3,000 rpm, about 5,000 rpm, about 7,000 rpm, or about 10,000 rpm. In another example, the motor 142 can rotate the rotating shaft 140 and consequently the one or more sets of impellers 122 at a rate of about 10 rpm to about 10,000 rpm, about 20 rpm to about 5,000 rpm, about 30 rpm to about 1,000 rpm, about 40 rpm to about 500 rpm, about 60 rpm to about 200 rpm, or about 80 rpm to about 120 rpm. In one or more embodiments, the rate of revolutions of the rotating shaft 140 can depend, at least in part, on the rate of slug flow through the slug catcher inlet 110.

The revolutions of the one or more impellers 122 can produce a second vortex of a heavier phase of the multi-phase mixture having the phase interface or separation loading area 170 near the bottom end 121 of the separator 104. The rotation of the impeller(s) 122 can force the multi-phase mixture contacting the impeller(s) 122 to project onto the inner walls 125, thus creating an artificial gravity or otherwise a force along the inner walls 125 of the separator 104. The artificial gravity or the force along the inner walls 125 of the separator 104 can result in the phase interface 170 being disposed along the inner walls 125 of the separator 104. The phase interface 170 of the second vortex can have a surface area greater than a cross-sectional area of the separator 104 in which at least a portion of the phase interface 170 can be disposed. The size of the phase interface 170 can be determined by the rate of revolutions of the rotating shaft 140, or more specifically, the rate of rotations of the one or more impellers 122. Two-phase separation of the multi-phase mixture can occur at the phase interface 170. The amount or size of the phase interface or separation loading area 170 can determine the amount or rate of separation of one phase from another. Any phase separation can occur at the phase interface 170. For example, a gaseous phase can be separated from a liquid phase at the phase interface 170 within the separator 104. In another example, a first liquid phase, e.g., a liquid hydrocarbon, can be separated from a second liquid phase, e.g., water, at the phase interface 170 within the separator 104.

The size or surface area of the phase interface or separation loading area 170 can be from a low of about 5%, about 10%, about 25%, about 50%, about 75%, or about 100% to a high of about 200%, about 500%, about 1,000%, or about 5,000% greater than the cross-sectional area of the separator 104. The phase interface 170 can be disposed at any location in the internal volume 127 of the separator 104. For example, the phase interface 170 can be disposed at any location in the internal volume 127 of the separator 104 between the separation tray 120 and the first end 121. In another example, the phase interface 170 can be disposed on, proximate, adjacent, or about the inner wall 125 of the separator 104 at any location between the annular space 168 and the bottom outlet 124. In a further example, at least a portion of the phase interface 170 can be disposed at any location in the internal volume 127 of the separator 104 from beneath at least one of the one or more sets of impellers 122 to proximate the annular space 168. In yet another example, at least a portion of the phase interface 170 can be disposed at any location in the internal volume 127 of the separator 104 on the inner wall 125 of the separator 104 between the one or more sets of impellers 122 and the separation tray 120. In yet another example, the phase interface 170 can be disposed at any location in the internal volume 127 of the separator 104 from on the inner wall 125 the annular space 168 to beneath all of the one or more sets of impellers 122.

At least a portion of the separation system 100 can include a support structure. For example, the support foundation 148 as depicted in FIG. 1. As depicted, the support foundation 148 can provide support for at least a portion of the separator 104. In one or more embodiments, the separation system 100 can have a modular design and can be at least partially or totally supported on or in a single module. Each module can contain at least one system 100. Each module can be located on a seabed, suspended subsea, located on an offshore platform, or located on land. Each module can be designed such that a plurality of systems 100 can be arranged serially or in a parallel manner. Each module can also be designed such that the entire system 100 can be hoisted from or lowered to a seabed at any desired depth.

FIG. 2 depicts a cross-sectional view along line 2-2 of the separator 104. As shown, the separator inlet 118 can at least partially penetrate the inner wall 125 of the separator 104. The separator inlet 118 can have a terminal end 218 disposed within the internal volume 127 of the separator 104. The terminal end 218 can have any desirable shape. For example, the terminal end 218 can have any shape that can impart rotational flow characteristics to the multi-phase mixture entering the separator 104. Various configurations of the separator inlet 118 can be possible. The separator inlet 118 can be disposed such that multi-phase mixture exiting the separator inlet 118, exits with a rotational flow, or vortex. The separator inlet 118 can be disposed within the internal volume of the separator 104 at any non-radial position with respect to a cross-section of the separator 104. For example, the separator inlet 118 can intersect the inner wall 125 tangentially.

The separation tray 120 is shown disposed within the internal volume of the separator 104 below the separator inlet 118. The separation tray 120 is shown having an outer perimeter 151 and an inner perimeter 150. The rotating shaft 140 having the outer surface 240 is shown disposed within the internal volume of the separator 104. As depicted, the rotating shaft 140 can be concentrically disposed within the separator 104 such that annular space can be present between the inner perimeter 150 and the outer surface 240 of the rotating shaft 140. The multi-phase mixture flowing through the transport line 116 can enter the separator 104 via the separator inlet 118. As the multi-phase mixture leaves the separator inlet 118, the multi-phase mixture flows around the interior of the inner wall 125 of the separator 104 in a rotational manner thus creating a vortex. The vortex of the multi-phase mixture can then flow over the separation tray 120 and through the annulus between the outer perimeter 151 of the separation tray 120 and the inner wall 125 of the separator 104. A separated lighter gaseous phase can flow up the annular space 168 between the rotating shaft 140 and the inner perimeter 150.

FIG. 3 depicts a cross-sectional view of part of the separator 104 including the separator inlet 118 and the separation tray disposed about the rotating shaft 140, according to one or more embodiments. The separator inlet 118 is depicted as being downwardly angled. The separator inlet 118 can be both downwardly angled and tangentially arranged. For example, the separator inlet 118 can be disposed at an angle relative to a horizontal plane intersecting the separator inlet 118. In some examples, the separator inlet 118 can be disposed at a decline with respect to horizontal thereby allowing the multi-phase mixture to immediately flow in a direction toward the bottom end 121, thus creating a downward spiral of the multi-phase mixture. The separator inlet 118 can be disposed at an angle of about 0°, about 5°, about 10°, about 25°, about 30°, about 40°, about 45°, about 65°, or about 85° to about 95°, or about 90°, about 115°, about 135°, about 155°, about 170°, about 175°, or about 180° relative to a horizontal plane intersecting the separator inlet 118. For example, the separator inlet 118 can be disposed at any angle between horizontal and vertical facing in a direction toward the bottom end 121. The separator inlet 118 can be arranged in relation to a horizontal plane and a vertical plane intersecting the separator inlet 118 such that multi-phase mixture flowing from the separator inlet 118 creates a vortex flow pattern (see arrow 166). As the multi-phase mixture leaves the separator inlet 118, the mixture can flow at least partially around the inner wall 125 of the separator 104 in a rotational manner thus creating a first vortex (see arrow 166). The first vortex 166 of the multi-phase mixture can flow over the separation tray 120 and through the annular space 168 between the outer perimeter 151 of the separation tray 120. The first vortex 166 of the multi-phase mixture passing through the annular space 168 can form at least part of the second vortex and thus at least part of the phase interface 170.

Figure 4:
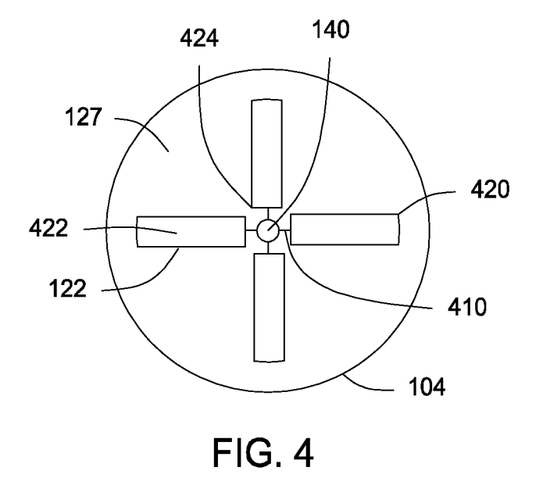
FIG. 4 depicts another cross-sectional view of the separator vessel depicted in FIG. 1 along line 4-4.

FIG. 4 depicts a cross-sectional view along line 4-4 of the separator 104. As shown, a set of impellers 122 can include a plurality of impeller paddles, or blades, 422 disposed within the internal volume 127 of the separator 104. Each impeller blade 422 can be connected to the rotating shaft 140 via one or more connecting members 410. Optionally, each impeller blade 422 can be formed integral with the rotating shaft 140. Each set of impellers 122 can include 1, 2, 3, 4, 5 to 6, 7, 8, 10, 12 impeller blades 422. Each impeller blade 422 can be straight or curved. Each blade 422 can be pitched at an angle of about 0°, about 5°, about 10°, about 25°, about 45°, about 65°, or about 85° to about 95°, or about 90°, about 115°, about 135°, about 155°, about 170°, about 175°, or about 180° relative to a horizontal plane intersecting each set of the one or more sets of impellers 122. For example, each blade 422 can be pitched in a substantially flat orientation on the rotating shaft 140 at an angle of about 0° relative to a horizontal plane intersecting each set of the one or more sets of impellers 122. In some embodiments, each blade 422 can be pitched at an angle of greater than 0°, such as about 5°, about 10°, about 25°, about 30°, about 40°, about 45°, about 55°, about 60°, about 70°, about 80°, about 85°, or less than 90° relative to a horizontal plane intersecting each set of the one or more sets of impellers 122. In some examples, each blade 422 can be pitched at an angle of greater than 30° to less than 60°, such as greater than 40° and less than 50°, for example, about 45°. Each blade 422 can have a connecting end 424 and a terminal end 420. In one or more embodiments, and as shown in FIG. 1, the connecting end 424 can be disposed above the terminal end 420.

In one or more embodiments, at least one impeller 122 represents an impeller having a plurality of blades disposed on a carrier disk (not shown). For example, each set of impellers 122 can represent one impeller having a plurality of blades disposed on a carrier disk. The plurality of blades can be disposed on a carrier disk such that the blades project radially on the carrier disk (not shown). Each blade of the plurality of blades can be straight or curved.

Figure 5:
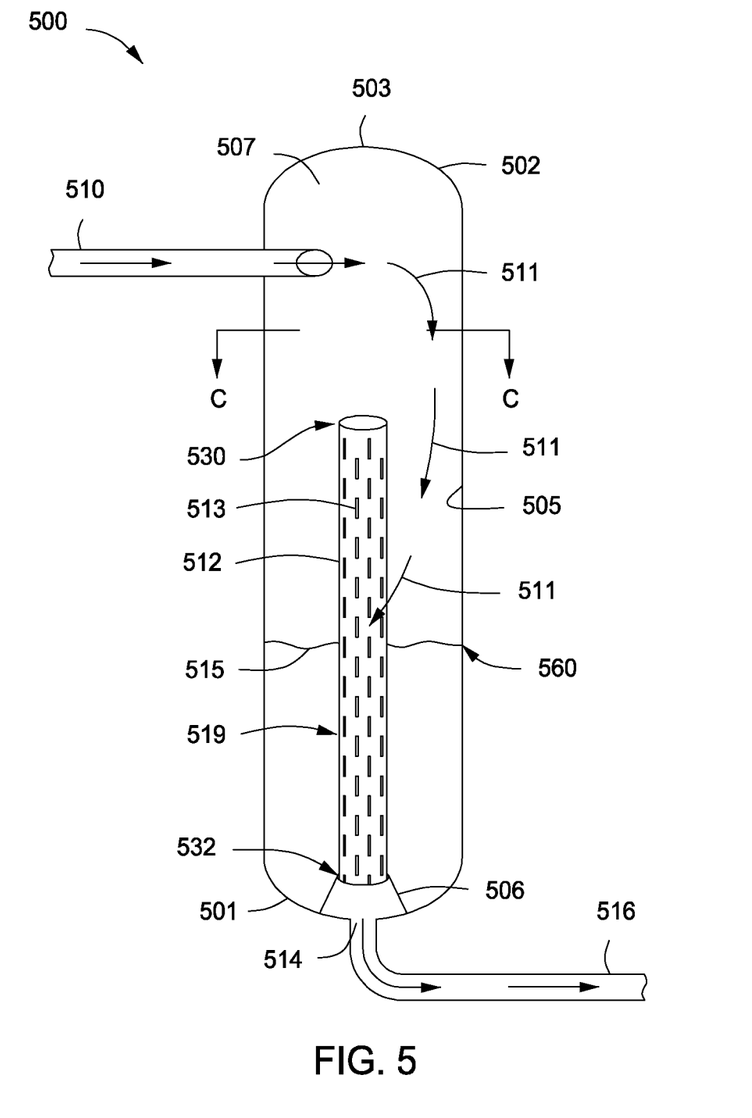
FIG. 5 depicts an illustrative slug catcher vessel, according to one or more embodiments described.

FIG. 5 depicts an exemplary mixing system 500 that can have a slug catcher vessel 502, according to one or more embodiments. The separator vessel 104, depicted in FIG. 1, can be in fluid communication with one or more initial or preliminary vessels, such as surge tanks or slug catcher vessels 502. The slug catcher vessel 502 can be placed subsea and can make the separator 104 independent of varying well properties, such as changes in flow rate and gas concentrations. The slug catcher vessel or simply "slug catcher" 502 can include one or more first inlets or "slug catcher inlets" 510, one or more inner tubes or "comingling siphons" 512, and one or more first outlets or "slug catcher outlets" 514. The slug catcher 502 can include an inner wall or surface 505, an enclosed first or "bottom" end 501, and an open (not shown) or enclosed second or "top" end 503. The slug catcher 502 can have any desired inner cross-sectional shape that can be, rectangular, elliptical, circular, oval, or any combination thereof. Depending, at least in part, on the configuration of the inner surface 505, the inner surface 505 can form or define, at least in part, an internal volume or "first internal volume" 507. For example, the inner surface 505 can form or define an internal volume 507 having a cylindrical, spherical, ellipsoidal, spheroidal (e.g., prolate or oblate), and/or frustoconical configuration or shape. The slug catcher inlet 510 can be positioned intermediate the first end 501 and the second end 503 and in fluid communication with the internal volume 507. The slug catcher outlet 514 can be positioned on or about the first end 501 and in fluid communication with the internal volume 507. Alternatively, the slug catcher outlet 514 can be positioned intermediate the first end 501 and the slug catcher inlet 510 and in fluid communication with the internal volume 507.

A longitudinal axis of the slug catcher vessel 502 can be vertically oriented or oriented at an angle with respect to vertical of about 1°, about 5°, about 10°, about 20°, or about 30° and about 60°, about 70°, or about 80°. The slug catcher vessel 502 or a longitudinal axis of the slug catcher vessel 502 can be at least substantially vertically oriented. As used herein, the term "substantially vertical" refers to about −20° to about 20°, about −15° to about 15°, about −10° to about −10°, about −5° to about −5°, about −3° to about 3°, about −2° to about 2°, about −1° to about 1°, about −0.1° to about 0.1°, or about −0.0001° to about 0.0001° with respect to vertical.

A multi-phase feed via inlet 510 having slug flow characteristics can be introduced to the internal volume 507 of the slug catcher vessel 502. The inner tube 512 can be disposed within the internal volume 507 of the slug catcher 502 so as to at least partially impede flow of a multi-phase feed between the slug catcher inlet 510 and the slug catcher outlet 514. The inlet 510 can be in fluid communication with the internal volume 507 at any location intermediate the top end 503 and the bottom end 501 of the slug catcher vessel 502. In some examples, the inlet 510 can be in fluid communication with the internal volume 507 at any location above an upper surface or level 515 of liquid, from the multi-phase mixture, within the internal volume 507. In another example, the inlet 510 can be disposed at any location intermediate the inner tube 512 and the top 503 of the slug catcher vessel 502.

At least a portion of the inner tube 512 can be positioned under the upper surface or level 515 of the multi-phase mixture within the internal volume 507. In one or more embodiments, the inner tube 512 can include a first or "bottom" end 532 and a second or "top" end 530. The level 515 can positioned within the volume 507 at any height intermediate the top end 530 and the bottom end 532 of the inner tube 512. The inner tube 512 can serve to mix at least a portion of the multi-phase mixture from the slug catcher inlet 510 toward the outlet 514 situated at the bottom end 501. The multi-phase mixture can have or exhibit a slug flow behavior, characteristic, or property. The multi-phase mixture leaving the slug catcher 502 from the bottom end 501 and entering the outlet 514 can create a flow 511 (see arrows), which can move at least a portion of the multi-phase mixture through holes or other perforations 513 in sidewalls 519 of the inner tube 512, into the interior of the inner tube 512 and downward along the interior of the inner tube 512 toward the bottom end 501. In some examples, the inner tube 512 has no holes or perforations disposed through the sidewalls 519.

The location of the outlet 514 can direct, at least in part, the flow pattern of the multi-phase mixture through the slug catcher 502. In some examples, the outlet 514 can be disposed at the center of the bottom end 501, such that the outlet 514 is axially aligned with the slug catcher vessel 502, so that the slug flow can enter the slug catcher 502 and travel downward and inward toward the centerline of the outlet 514, resulting in a flow of fluid toward the centerline of the slug catcher vessel 502. The flow direction can thus force the multi-phase mixture through the perforations of the inner tube 512, transforming the multi-phase feed having a slug flow behavior or characteristic entering the slug catcher 502 via inlet 510 into a multi-phase mixture having no or reduced slug flow characteristic or a multi-phase mixture exiting the slug catcher 502 via outlet 514.

The inner tube 512 can have any suitable shape, design, or configuration that can alter the direction of the flow of a multi-phase mixture introduced via the slug catcher inlet 510 to the internal volume 507. For example, the shape, design, or configuration of the inner tube 512 can be suitable to help mix, comingle, stir, or otherwise combine at least two phases of the multi-phase mixture. In another example, the shape, design, or configuration of the inner tube 512 can be suitable to obtain an at least partially multi-phase mixture in the outlet 514 from a multi-phase mixture having a slug flow entering the slug catcher vessel 502 via the inlet 510. As shown, the inner tube 512 can have a cylindrical shape having a circumference and a length less than that of the slug catcher 502.

The perforations or holes 513 disposed through the sidewalls 519 of the inner tube 512 can be of a sufficient size and shape to allow a multi-phase fluid flow through. In one or more embodiments, the sidewalls, or surface, 519 of the inner tube 512 can be a mesh, screen, a web structure, or latticework having openings through which a multi-phase fluid can flow. The inner tube 512 can be sized and positioned such that the multi-phase mixture can flow from outside the inner tube 512 to the inside of the inner tube 512 and through the perforations 513 toward the bottom end 501. For example, the inner tube 512 can be a substantially cylindrical tube open on each end and positioned so that flow from outlet 514 causes the flow to enter the inner tube walls and travel downward through the interior of the inner tube and out of the outlet 514. In another example, the second end 530 of inner tube 512 can be enclosed or capped off. In yet another example, the second end 530 of inner tube 512 can also include perforations 513. The inner tube 512 can have a perimeter that allows flow between the edges of the inner tube 512 and the inner surface 505 of the slug catcher 502. In another example, the inner tube 512 can be or include a mesh tube, a wire tube, a perforated tube, a tube having a wire or mesh screen. In a further example, the inner tube 512 can have a conical shape or a frustoconical shape.

The perforations 513 disposed through the sidewalls 519 of the inner tube 512 can have a uniform or non-uniform distribution on at least a portion of the sidewalls 519 of the inner tube 512. For example, the perforations 513 disposed through the sidewalls 519 of the inner tube 512 can have a uniform distribution about the sidewalls 519 of the inner tube 512. The perforations 513 can have any desired size. In one or more embodiments, the perforations 513 can have any size sufficient to mitigate slug flow in the multi-phase mixture leaving the slug flow catcher 502 from the outlet 514. The perforations 513 can each have a size, defined by its largest dimension, ranging from a low of about 1 µm to a high of about 10 mm. The perforations 513 can be uniformly spaced from each other throughout the sidewalls 519 at distances ranging from a low of about 1 µm to a high of about 10 mm.

The inner tube 512 can be disposed at a distance from the outlet 514. For example, the bottom end of 532 of the inner tube 512 can be disposed at a distance or spaced apart from the outlet 514 resulting in a void space between the inner tube 512 and the bottom end 501. In some examples, the inner tube 512 can be axially offset from the outlet 514. The inner tube 512 can be supported or suspended within the slug catcher vessel 502 in any desirable manner. For example, the inner tube 512 can be supported on the bottom end 501 of the slug catcher vessel 502 via one or more support members 506. In another example, the inner tube 512 can be supported via at least one support member 506 or pair of support members 506 disposed on the bottom end 501 of the slug catcher vessel 502. The support members 506 can include rods, pipes, scaffolding, trusses, beams, or any other structure or structures capable of supporting the inner tube 512. In an example not shown, the inner tube 512 can be supported by support members or any other structure disposed on the interior wall 505 of the vessel 502. In another example not shown, the inner tube 512 can be supported from the top 503 via support members or other structure.

The bottom end 501 can be flat, sloped or angled, or a combination thereof. For example, a sloped bottom end 501 can be configured to allow settling particles to move away from the inner surface 505 and/or to direct flow toward the outlet 514 of the surge catcher vessel 502. The bottom end 501 can have a conical shape or a frustoconical shape that tends to concentrate settled particles at or toward the center of the bottom end 501. The bottom end 501 can also be sloped so that settled particles concentrate at a location away from the center of the bottom end 501. For example, the bottom end 501 can have an eccentric cone or offset cone configuration.

The slug catcher 502 can be fluidly coupled to the separator 104 depicted in FIG. 1 via the line 116. The line, or transport line, 116 can be fluidly coupled to the slug catcher 502 via the slug catcher outlet 514 and fluidly coupled to the separator 104 via the separator inlet 118. The line 116 can include any one or more pipes or one or more conduits sufficient to provide open fluid communication between the slug catcher 502 and the separator 104. The transport line 116 can include any pipe, tubular, or other conduit having an inner cross-sectional shape that can be square, rectangular, triangular, elliptical, circular, oval, or any combination thereof. The transport line 116 can include a plurality of pipes, tubulars, or other conduits, connected in series.

The slug catcher 502 can have a low pressure differential between the pressure inside the slug catcher 502 and the pressure outside the slug catcher 502. For example, the pressure differential between the pressure inside the slug catcher 502 and the pressure outside the slug catcher 502 can be about 100,000 kPa or less, about 70,000 kPa or less, about 35,000 kPa or less, or about 20,000 kPa or less. In some examples, the pressure differential between the pressure inside the slug catcher 502 and the pressure outside the slug catcher 502 can be about 1 kPa to about 70,000 kPa, about 700 kPa to about 35,000 kPa, or about 3,500 kPa to about 20,000 kPa. A low pressure differential can result in the ability that can be placed subsea with low wall thickness requirements. For example, the slug catcher 502 can have a wall thickness of about 25 cm or less, about 15 cm or less, about 10 cm or less, about 5 cm or less, about 2 cm or less, or about 1 cm or less. In some examples, the slug catcher 502 can have a wall thickness of about 0.1 cm to about 20 cm, about 0.2 cm to about 10 cm, about 0.5 cm to about 5 cm, or about 0.8 cm to about 2 cm.

Figure 6:
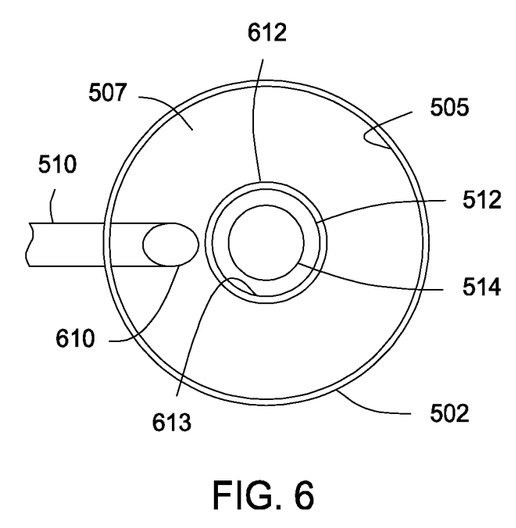
FIG. 6 depicts a cross-sectional view of the slug catcher vessel depicted in FIG. 5 along line 6-6.

Turning now to FIG. 6, a cross-sectional view is depicted along line 6-6 of the slug catcher vessel 502. As shown, the slug catcher inlet 510 can at least partially penetrate the inner wall 505 of the slug catcher vessel 502. At least a portion of the slug catcher inlet 510 can be disposed at any location within the internal volume 507 and above the inner tube 512. The slug catcher inlet 510 can have a terminal end 610 disposed within the internal volume 507. An outlet 514 can be disposed on or near the centerline of the slug catcher vessel 502 and at the bottom end of the slug catcher vessel 502. The inner tube 512 can have any size diameter sufficient to be disposed within the internal volume 507 of the slug catcher 502. For example, the inner tube 512 can have any diameter larger than that of the outlet 514 and smaller than that of the slug catcher vessel 502. In another example, the inner tube 512 diameter can be from a low of about 1%, about 5%, about 10%, about 15%, about 20%, or about 25% to a high of about 30%, about 40%, about 50%, about 60%, about 70%, or about 80% the diameter of the slug catcher vessel 502. In a further example, the diameter of the outlet 514 can be from a low of about 5%, about 10%, about 20%, about 30%, about 40%, or about 45% to a high of about 50%, about 60%, about 70%, about 80%, about 90%, or about 99% the diameter of the inner tube 512.

The inner tube 512 can be disposed within the slug catcher 502 such that the outlet 514 can be axially aligned with the inner tube 512. In some examples, the inner tube 512 can be disposed within the slug catcher 502 and the outlet 514 can have a diameter of less than or equal to the diameter of the inner tube 512. Therefore, the outlet 514 can appear concentrically positioned within the inner tube 512 from a cross-sectional view along line A of the slug catcher vessel 502. The inner tube 512 can have an outer surface 612 and an inner surface 613. The inner tube can be concentrically positioned within the internal volume 507 of the slug catcher vessel 502 such that an annular space can be created between the outer surface 612 of the inner tube and the inner wall 505 of the slug catcher vessel 502.

The terminal end 610 of the slug catcher inlet 510 can be disposed at any location within the internal volume 507 and above the inner tube 512. For example, the terminal end 610 can be disposed at any location at a radius between the outer surface 612 of the inner tube and the inner wall 505 of the slug catcher vessel 502. In one or more embodiments, the terminal end 610 can be disposed within the internal volume 507 at any location such that at least a portion of slug flow inlet feed contacts the inner walls 505 before the inner tube 512. In one or more embodiments, the terminal end 610 can be disposed within the internal volume 507 at any location such that at least a portion of the slug flow inlet feed enters the annular space between the outer surface 612 of the inner tube 512 and the inner walls 505.

Figure 7:
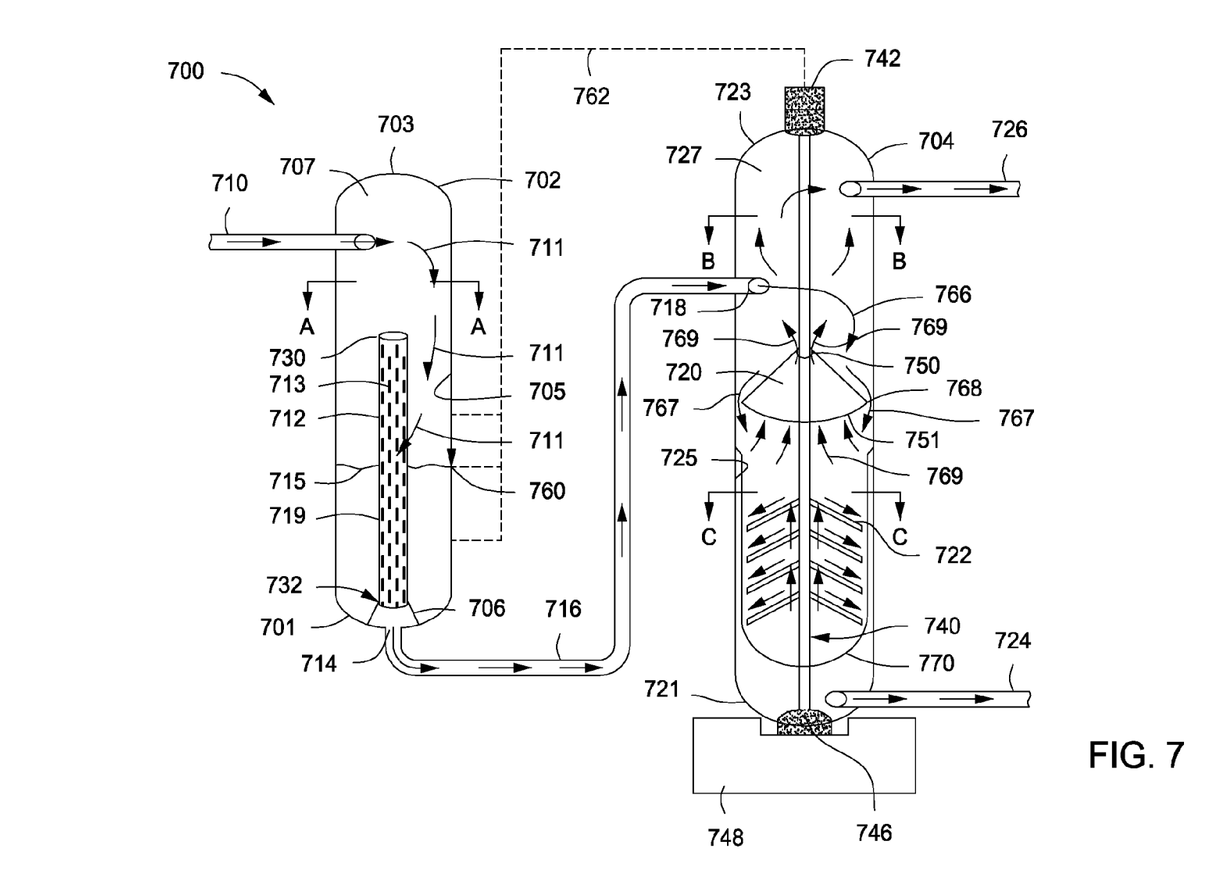
FIG. 7 depicts an illustrative separation system that includes a slug catcher vessel and a separator vessel, according to one or more embodiments described.

Referring now to an overall flow pattern within a system 700 as depicted in FIG. 7 (see arrows), a multi-phase feed having slug flow characteristics can enter a slug catcher vessel 702 via an inlet 710, such as, for example, a slug catcher inlet. The multi-phase feed can then at least partially fill the slug catcher vessel 702, creating a fluid level 715. The multi-phase fluid within the slug catcher vessel 702 can exit the slug catcher vessel 702 via an outlet 714 disposed at the center of the bottom end 701. The multi-phase fluid leaving the slug catcher vessel 702 from the bottom end 701 and entering the outlet 714 can create a flow (see arrows), which moves at least a portion of the multi-phase feed having slug flow characteristics through perforated walls 719 of the inner tube 712, into the interior of the inner tube 712 and downward along the interior of the inner tube 712 toward the bottom end 701. As the slug flow enters the slug catcher vessel 702, the slug flow can travel downward and inward toward the centerline of the outlet 714, resulting in a flow of fluid toward the centerline of the slug catcher vessel 702. This flow direction can force the multi-phase mixture through the perforations transforming the slug flow entering the slug catcher vessel 702 via the inlet 710 into a multi-phase mixture having reduced slug flow characteristics, or multi-phase mixture, exiting the slug catcher vessel 702 via the outlet 714.

The multi-phase mixture can exit the outlet 714 and travel to the separator 704 via a transport line 716. The multi-phase mixture then can enter the separator 704 via the tangential inlet 718 (see arrows). As the multi-phase mixture leaves the tangential inlet 718, the multi-phase mixture can flow around the interior of the inner wall 725 of the separator 704 in a rotational manner thus creating a first vortex (see arrows). The first vortex of the multi-phase mixture can then flow over the separation tray 720 and through an annulus 768 between the outer perimeter 751 of the separation tray 720 and the inner wall 725 of the separator 704. A separated lighter phase can flow up the internal volume of the separator 704 through the inner circle as shown (see arrows). The tray 720 along with the one or more sets of impellers 722 can enhance liquid filming along the inner wall 725 of the separator 704 and allow gas and/or lighter phase fluid to channel through the center of the tray 720 as the gas and/or lighter phase fluid travels up the internal volume 727 of the separator 704. As the multi-phase mixture encounters the impellers 722, the impellers can increase the circumferential acceleration of the multi-phase mixture. This can create a separation loading area 770 along the inner wall 725 of the separator 704. Utilizing at least a portion of the inner wall 725 can increase the total surface area of the separation loading area 170. At the bottom end 721 of the separator 704 the higher density liquid can create a second vortex. The second vortex can force the lighter phase, lower density liquid/gas upward through the internal volume 727 of the separator 704. Lower density liquid/gas can be removed from the top end 723 via outlet 726 and the heavier phase, higher density liquid can be removed from the bottom end 721 via outlet 724. The impellers 722 can be controlled by the slug catcher liquid level 715. Based, at least in part, on slug catcher feed rates, the liquid level 715 can speed up or slow down the impeller velocity.

The rotational speed or rate of the one or more impellers 722 can be adjusted to increase a centrifuge effect on the multi-phase mixture as the multi-phase mixture falls beneath the one or more trays 720 and onto the impellers 722. The centrifuge effect can result in at least a portion of the separation loading area 770 being positioned on the inner wall 725, thus increasing the overall size of the separation loading area 770 and the amount of separation of a lighter phase from a heavier phase. The rotational speed or rate of the motor 742 can be adjusted in order to maintain a consistent liquid level 715 in the slug catcher vessel 702.

In one or more embodiments, the slug catcher vessel 702 can include one or more level indicators, or level sensors, 760. Data can be obtained from the level sensor 760 and can be transmitted via a network of one or more transmission lines 762 to the motor 742, so that the liquid level 715 within the slug catcher vessel 702 can determine the speed of the one or more sets of impellers 722. In one or more embodiments, the size of the separation loading area 770 in the separator 704 can be dependent on the height of the liquid level 715 in the slug catcher vessel 702. For example, data obtained from the level sensor 760 can be sent to a control system (not shown) to control the speed of the impellers 722 such that the liquid level 715 within the slug catcher vessel 702 can control the size of the separation loading area 770 in the separator 704.

In one or more embodiments, the transport line 716 can include multi-phase meter (not shown). The multi-phase meter can monitor the flow rate of the multi-phase mixture or the multi-phase mixture traveling to the separator inlet 718. For example, the multi-phase meter can motor the flow rate of each phase within the multi-phase mixture or the multi-phase mixture. Data can be obtained from the multi-phase meter and can be transmitted to the motor 742 via a network of one or more transmission lines so that the flow rate and phase content of the multi-phase mixture in the transport line 716 can determine the speed of the one or more sets of impellers 722, and thus the size of the separation loading area 770. For example, the rate of impeller rotation can increase as the concentration of liquid in the multi-phase mixture increases. In some examples, the rate of impeller rotation can increase as the flow rate of the multi-phase mixture increases.

The multi-phase mixture introduced via the inlet 710 can be a gas/liquid/particulate mixture having a dynamic viscosity in accordance with ASTM D445 up to about 500,000 centipoise (cP). For example, the gas/liquid/particulate mixture can have a viscosity ranging from a low of about 1 cP to a high of about 500,000 cP.

The crude oil present can have an API gravity in accordance with ASTM D287 at 60° F. of at least about 7° API, at least about 8° API, at least about 10° API, or at least about 11° API. For example, the oil present can have an API gravity ranging from a low of about 5° API, about 7° API, about 10° API, about 11° API, or about 15° API to a high of about 20° API, about 30° API, about 45° API, about 70° API, or about 100° API. The crude oil present can have a dynamic viscosity in accordance with ASTM D445 of up to about 500,000 cP, up to about 200,000 cP, about 150,000 cP, or up to about 100,000 cP. For example, the crude oil present can have a viscosity ranging from a low of about 1 cP, about 10 cP, about 50 cP, about 200 cP, or about 1,000 cP to a high of about 10,000 cP, about 50,000 cP, about 100,000 cP, about 200,000 cP, or about 500,000 cP.

The system 700 can also include an intermediate outlet (not shown). The intermediate outlet can positioned on the separator 704 at any location intermediate the saturated gas outlet 726 and the liquid/solid outlet 724. For example, the intermediate outlet can positioned on the separator 704 at any location intermediate the separation tray 720 and the liquid/solid outlet 724. The mixture discharged from the intermediate outlet can be a liquid/gas mixture having a gas concentration ranging from a low of about 1 wt % to a high of about 99 wt %. The gas present in the liquid/gas mixture can include hydrocarbon gases, such as methane, ethane, and the like.

At least a portion of the system 700 can include a support structure. For example, a support foundation 748 is depicted in FIG. 7. As depicted, the support foundation 748 can provide support for at least a portion of the separator 704. In one or more embodiments, the system 700, including the slug catcher vessel 702 and the separator 704, can have a modular design and can be at least partially or totally supported on or in a single module. Each module can contain at least one system 700. Each module can be designed such that a plurality of systems 700 can be arranged serially or in a parallel manner. Each module can also be designed such that the entire system 700 can be hoisted from or lowered to a seabed at any desired depth.

The slug catcher vessel 702, the separator vessel 704, and any of one or more parts or components therein can be made from suitable metals, metal alloys, composite materials, polymeric materials, or the like. For example, the slug catcher vessel 702, including the inlet 710 and the outlet 714 can be composed of stainless steel, carbon steel, or low chrome steel, and the internals, e.g., the inner tube 712 and the support members 706, can be composed of stainless steel, carbon steel, or low chrome steel. For example, the separator 704, including the transport line 716, the inlet 718, the upper outlet 726, and the lower outlet 724, can be composed of stainless steel, carbon steel, or low chrome steel, and the internals, e.g., the separation tray 720, the shaft 740, and the one or more sets of impellers 722 can be composed of stainless steel, carbon steel, or low chrome steel.

Figure 8:
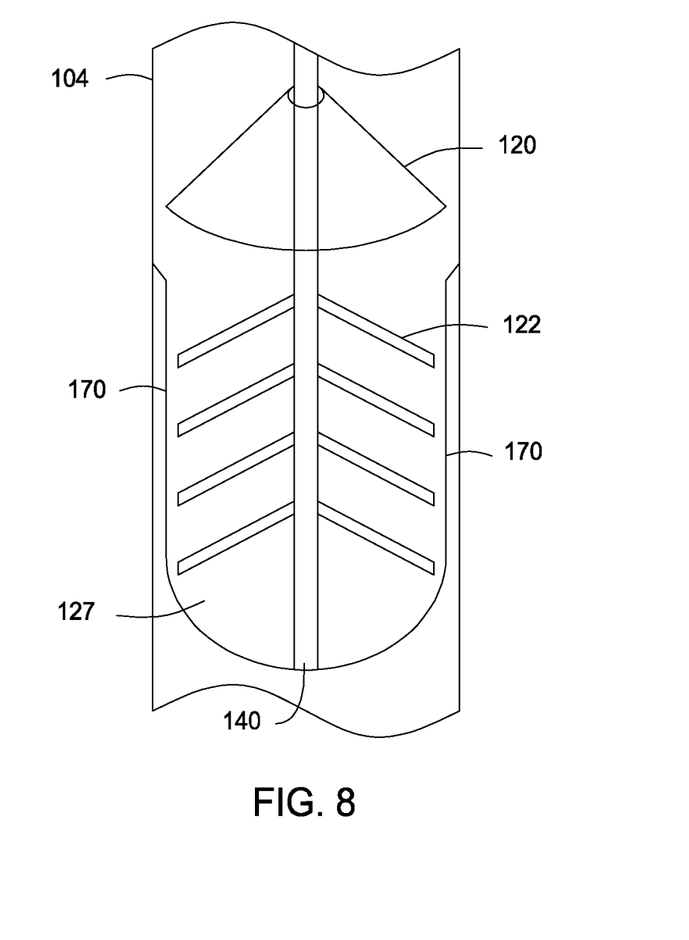
FIG. 8 depicts a partial cross-sectional side view of a separation loading area within the separator vessel depicted in FIG. 7, according to one or more embodiments described.

FIG. 8 depicts a cross-sectional view of part of the separation loading area 170 disposed in the internal volume 127 of the separator 104 depicted in FIG. 1. Revolutions of the one or more sets of impellers 122 can produce a second vortex of a heavier phase of the multi-phase mixture having a gas-liquid interface or surface about, conformed, against, or otherwise in contact with the separation loading area 170 within the internal volume 127 of the separator 104. The gas-liquid interface or surface of the second vortex, in contact with the separation loading area 170, can have a surface area greater than a cross-sectional area of the separator 104 in which at least a portion of the surface can be disposed in the separator 104. The rotational speed or rate of the one or more impellers 122 can result in a centrifuge effect on the multi-phase mixture as the mixture falls beneath the one or more trays 120 and onto the one or more sets of impellers 122. As shown in FIG. 8, the centrifuge effect can result in at least a portion of the separation loading area 170 being positioned on the inner wall 125, thus increasing the overall size of the separation loading area 170 and the amount of separation of a lighter phase from a heavier phase.

Embodiments of the present disclosure further relate to any one or more of the following paragraphs:

1. A separation system, comprising: a vessel having a first end, a second end, an internal volume, an inlet, a first outlet, and a second outlet; at least one separation tray disposed within the internal volume, wherein the inlet is disposed between the separation tray and the second end; and at least one impeller connected to a shaft and disposed within the internal volume, wherein the shaft is mechanically linked to a motor, and wherein the at least one impeller is disposed between the at least one separation tray and the first end.

2. The system according to paragraph 1, wherein the inlet enters the vessel in a tangential direction.

3. The system according to paragraphs 1 or 2, wherein the inlet enters the vessel at a decline with respect to horizontal.

4. The system according to any one of paragraphs 1 to 3, wherein the vessel is substantially vertically oriented such that the first end is a bottom end and the second end is a top end.

5. The system according to paragraph 4, wherein the separation tray has a frustoconical shape and comprises an inner perimeter and an outer perimeter, and wherein the separation tray is disposed within the internal volume such that the inner perimeter is at a height within the internal volume higher than that of the outer perimeter.

6. The system according to paragraph 5, wherein the separation tray is concentrically disposed within the internal volume such that an annular space is formed between the outer perimeter and an inner wall of the vessel.

7. The system according to any one of paragraphs 1 to 6, wherein the inlet is in fluid communication with a preliminary vessel upstream of the vessel, wherein the preliminary vessel further comprises one or more level sensors adapted to transmit a signal to the motor.

8. The system according to any one of paragraphs 1 to 7, wherein the inlet is in fluid communication with a transport line upstream of the vessel, wherein the transport line comprises a multi-phase flow meter adapted to transmit a signal to the motor.

9. The system according to any one of paragraphs 1 to 7, wherein the at least one impeller comprises 2 sets of impellers to about 10 sets of impellers, and each set of impellers comprises 2 impeller blades to about 12 impeller blades.

10. The system according to paragraph 9, wherein each blade impeller is pitched at an angle of greater than 30° to less than 60°, relative to a horizontal plane intersecting each set of impellers.

11. A mixing system, comprising: a vessel having a first end, a second end, an internal volume, an inlet and an outlet, wherein the outlet is disposed on the first end; and an inner tube disposed within the internal volume and axially offset from the outlet.

12. The system according to paragraph 11, wherein the vessel is substantially vertically oriented such that the first end is a bottom end and the second end is a top end.

13. The system according to paragraph 12, wherein the inner tube is a hollow cylinder having a surface with an open lower end.

14. The system according to any one of paragraphs 11 to 13, wherein the inner tube comprises a plurality of perforations radially disposed therethrough.

15. The system according to paragraph 13, wherein the open lower end of the inner tube is spaced apart from the outlet and the first end.

16. The system according to any one of paragraphs 11 to 15, wherein the inner tube comprises a diameter of about 10% to about 50% of a diameter of the first vessel.

17. A separation system, comprising: a vessel having a first end, a second end, an internal volume, an inlet and an outlet, wherein the outlet is disposed on the first end; an inner tube disposed within the internal volume and axially offset from the outlet; a second vessel having a first end, a second end, a second internal volume, a second inlet in fluid communication with the first outlet and entering the second vessel in a tangential direction with respect to a cross-sectional area of the separation vessel, a second outlet and a third outlet each in fluid communication with the second internal volume; at least one separation tray disposed within the second internal volume, wherein the second inlet is disposed between the separation tray and the second end; and at least one impeller connected to a shaft and disposed within the second internal volume, wherein the shaft is mechanically linked to a motor, and wherein the at least one impeller is disposed between the at least one separation tray and the first end.

18. The separation system according to paragraph 17, wherein the separation tray comprises an inner perimeter and an outer perimeter, and wherein the separation tray is disposed within the second vessel such that the inner perimeter is at a height within the internal volume of the second vessel higher than that of the outer perimeter.

19. The separation system according to paragraph 18, wherein the separation tray is concentrically disposed within the internal volume such that an annular space is formed between the outer perimeter and an inner wall of the vessel.

20. The separation system according to any one of paragraphs 17 to 19, wherein the first vessel further comprises one or more level sensors disposed on at least one wall of the first vessel, wherein the one or more level sensors are adapted to transmit a signal to the motor.

21. The separation system according to any one of paragraphs 17 to 20, wherein the wherein the second inlet is in fluid communication with a transport line upstream of the vessel, wherein the transport line comprises a multi-phase flow meter adapted to transmit a signal to the motor.

22. A method for separating a multi-phase mixture, comprising: introducing a multi-phase mixture into a tangential inlet of a vessel having a first end, a second end, an internal volume, a first outlet, and a second outlet, wherein the multi-phase mixture exiting the tangential inlet enters the vessel in a tangential direction with respect to a cross-sectional area of the vessel; contacting the multi-phase mixture with at least one separation tray disposed within the internal volume; contacting the multi-phase mixture with at least one impeller disposed on a shaft, wherein the at least one impeller is disposed between the at least one separation tray and the first end, and wherein the tangential inlet is disposed between the separation tray and the second end; rotating the at least one set of impellers via a motor mechanically linked to the shaft; obtaining a light phase product from a first outlet in fluid communication with the internal volume; and obtaining heavy phase product from a second outlet in fluid communication with the internal volume.

23. The method according to paragraph 22, wherein the multi-phase mixture comprises water, liquid hydrocarbons, and gaseous hydrocarbons.

24. The method according to paragraphs 22 or 23, wherein the multi-phase mixture has a rotational flow pattern leaving the tangential inlet, resulting in a first vortex of the multi-phase mixture above the separation tray.

25. The method according to paragraph 24, wherein the rotating of the at least one set of impellers results in or forms a second vortex of the multi-phase mixture, wherein the rotation of the at least one set of impellers also results in or forms an artificial gravity or a force on at least a portion of the multi-phase mixture on inner walls of the vessel below the separation tray.

26. The method according to any one of paragraphs 22 to 25, wherein a flow rate of liquid phase components entering the vessel determines a rate of rotation of the at least one set of impellers.

Certain embodiments and features have been described using a set of numerical upper limits and a set of numerical lower limits It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure may be devised without departing from the basic scope thereof, and the scope thereof is determined by the claims that follow.

What is claimed is:

1. A separation system, comprising:
a vessel having a first end, a second end, an internal volume, an inlet, a first outlet, and a second outlet;
at least one separation tray disposed within the internal volume, wherein the inlet is disposed between the separation tray and the second end; and
at least one impeller connected to a shaft and disposed within the internal volume, wherein the shaft is mechanically linked to a motor, and wherein the at least one impeller is disposed between the at least one separation tray and the first end.

2. The system of claim 1, wherein the inlet enters the vessel in a tangential direction.

3. The system of claim 2, wherein the inlet enters the vessel at a decline with respect to horizontal.

4. The system of claim 1, wherein the vessel is substantially vertically oriented such that the first end is a bottom end and the second end is a top end.

5. The system of claim 4, wherein the separation tray has a frustoconical shape and comprises an inner perimeter and an outer perimeter, and wherein the separation tray is disposed within the internal volume such that the inner perimeter is at a height within the internal volume higher than that of the outer perimeter.

6. The system of claim 5, wherein the separation tray is concentrically disposed within the internal volume such that an annular space is formed between the outer perimeter and an inner wall of the vessel.

7. The system of claim 1, wherein the inlet is in fluid communication with a preliminary vessel upstream of the vessel, wherein the preliminary vessel further comprises one or more level sensors adapted to transmit a signal to the motor.

8. The system of claim 1, wherein the inlet is in fluid communication with a transport line upstream of the vessel, wherein the transport line comprises a multi-phase flow meter adapted to transmit a signal to the motor.

9. The system of claim 1, wherein the at least one impeller comprises 2 sets of impellers to about 10 sets of impellers, and each set of impellers comprises 2 impeller blades to about 12 impeller blades.

10. The system of claim 9, wherein each blade impeller is pitched at an angle of greater than 30° to less than 60°, relative to a horizontal plane intersecting each set of impellers.

11. A separation system, comprising:
a vessel having a first end, a second end, an internal volume, an inlet and an outlet, wherein the outlet is disposed on the first end;
an inner tube disposed within the internal volume and axially offset from the outlet;
a second vessel having a first end, a second end, a second internal volume, a second inlet in fluid communication with the first outlet and entering the second vessel in a tangential direction with respect to a cross-sectional area of the separation vessel, a second outlet and a third outlet each in fluid communication with the second internal volume;
at least one separation tray disposed within the second internal volume, wherein the second inlet is disposed between the separation tray and the second end; and
at least one impeller connected to a shaft and disposed within the second internal volume, wherein the shaft is mechanically linked to a motor, and wherein the at least one impeller is disposed between the at least one separation tray and the first end.

12. The separation system of claim 11, wherein the separation tray comprises an inner perimeter and an outer perimeter, and wherein the separation tray is disposed within the second vessel such that the inner perimeter is at a height within the internal volume of the second vessel higher than that of the outer perimeter.

13. The separation system of claim 12, wherein the separation tray is concentrically disposed within the internal volume such that an annular space is formed between the outer perimeter and an inner wall of the vessel.

14. The separation system of claim 11, wherein the first vessel further comprises one or more level sensors disposed on at least one wall of the first vessel, wherein the one or more level sensors are adapted to transmit a signal to the motor.

15. The separation system of claim 11, wherein the wherein the second inlet is in fluid communication with a transport line upstream of the vessel, wherein the transport line comprises a multi-phase flow meter adapted to transmit a signal to the motor.

* * * * *